Sept. 14, 1965 B. L. AVERBACH 3,206,325

PROCESSS FOR PRODUCING MAGNETIC PRODUCT

Filed Sept. 14, 1961

INVENTOR.
Benjamin L. Averbach
BY
Morse & Altman
ATTORNEYS 3,206,325

PROCESS FOR PRODUCING MAGNETIC PRODUCT

Benjamin L. Averbach, Belmont, Mass., assignor to The Alloyd Corporation, Cambridge, Mass.

Filed Sept. 14, 1961, Ser. No. 138,143
3 Claims. (Cl. 117—107.1)

The present invention relates to magnetic recording and, more particularly, to processes by which a non-magnetic substrate is coated with a ferromagnetic stratum that may be provided incrementally with information in the form of residual magnetism. Conventionally such a ferromagnetic stratum has been composed of iron oxide or the like. Heretofore proposed pure metallic strata have not had the physical-chemical properties necessary for practical magnetic recording.

The primary object of the present invention is to provide practical processes for producing magnetic recording products, in which the ferromagnetic stratum is an essentially metallic coating in the form of a distribution of microscopic grains owing their physical-chemical characteristics to their deposition from a heat decomposable vapor under particular conditions. In accordance with the present invention, such a ferromagnetic stratum is capable of serving with an electro-acoustic transducing system to record audio signals.

Other objects of the present invention will in part be obvious and will in part appear hereinafter.

For a fuller understanding of the nature and objects of the present invention, reference should be had to the following detailed description taken in connection with the accompanying drawing, wherein.

THE PRODUCT OF THE PRESENT INVENTION

Figure 1:
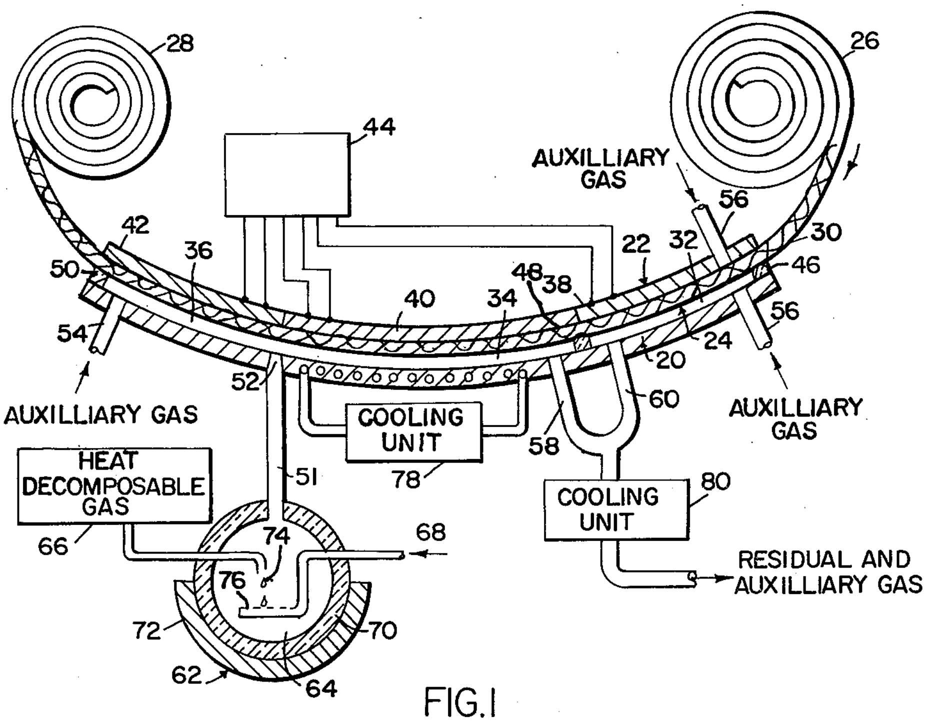
FIG. 1 is an exaggerated cross-sectional view of a processing system for producing a product embodying the present invention.
Figure 2:
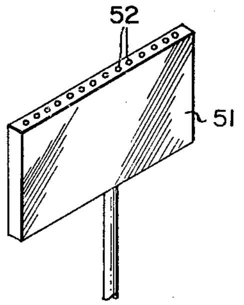
FIG. 2 is a perspective view of a component of the device of FIG. 1.
Figure 3:
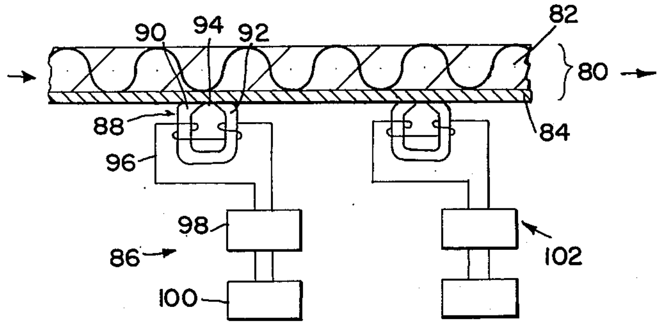
FIG. 3 is an exaggerated cross-sectional view of a recording system incorporating the product of FIG. 1.

Generally, the product produced by the system of FIG. 1 for use in the system of FIG. 3 comprised a substrate in the form of a thin strip and a coating in the form of a distribution of grains substantially ranging from 5,000 to 20,000 A. in extent. The coating, which ranges from 30 to 100 millionths of an inch thick, contains, by total weight, at least 97% metal and at most 3% nonmetal. Preferably, by total weight, the coating comprises: from 30 to 70% iron; from 30 to 70% of a metal selected from the class consisting of cobalt and nickel; from 0 to 40% of at least one metal selected from the class consisting of chromium, maganese, gadolinium, vanadium, aluminum, titanium, copper and niobium; and from a trace to 3% of a nonmetal selected from the class consisting of carbon and oxygen, of which at least between a trace and 1¼% is carbon. In one embodiment of the present invention, similar coatings are deposited on opposite sides of the substrate. The substrate may be any nonmagnetic material, preferably a fibrous material such as paper or a polymeric material such as polyethylene terephthalate sold by Du Pont under the trade designation Mylar. Paper, of conventional matted cellulose fiber composition, is a particularly effective but inexpensive base notwithstanding its porosity. In accordance with the present invention, the metal is deposited from a heat decomposible gas containing an iron carbonyl, preferably iron pentacarbonyl. The deposition occurs on successive increments of the substrate at an elevated temperature ranging from 180 to 350° C. in the presence of an inert gas. In the case of a paper substrate, the successive increments are subjected to the elevated temperature for a period ranging from .5 to 100 seconds. By reason of the fact that one of the products of the decomposition of the carbonyl is carbon monoxide, the necessary small percentage of carbon inherently results.

THE SYSTEM OF FIG. 1

The system illustrated in FIG. 1 for producing the product of the present invention is shown generally as comprising an inwardly concave wall 20 and an outwardly concave wall 22 which define therebetween a curved chamber 24. Preferably the distance between the adjacent surfaces of walls 20 and 22 ranges between 1/32 and 5/32 of an inch and preferably is approximately ⅛ of an inch. Side walls (not shown) complete curved chamber 24 except for its ends. The open ends of chamber 24 are adjacent, respectively, to a supply spool 26 and a take-up spool 28 for a substrate 30 to be advanced through chamber 24. Chamber 24 includes a preheat zone 32, a decomposition zone 34 and a dwell zone 36. Substrate 30 advances through preheat zone 32, decomposition zone 34 and dwell zone 36, in sequence, while constrained against wall 22 throughout its length. Wall 22 includes sections 38, 40 and 42, which respectively incorporate separate heating elements extending throughout their lengths, that are energized by a suitable electrical source 44.

Gaskets 46, 48 and 50 respectively, partially seal zone 32 from its exterior, zones 32 and 34 from each other and zone 36 from its exterior. A mixture of auxiliary and heat decomposable gas is introduced at the junction of zones 36 and 34 through a series of small holes in a vent component 51, one hole of which is shown in FIG. 1 at 52. Additionally, auxiliary gas is introduced at the outer extremities 54 and 56 of zones 36 and 32. Residual and auxiliary gas is exhausted from zones 34 and 36 at the junction 58 between zone 34 and 32. Auxiliary gas is exhausted from zone 32 at its inner extremity 60. The arrangement is such that heat decomposable gas is directed only through decomposition zone 34 in consequence of higher pressures of the auxiliary gas in preheat zone 32 and dwell zone 36.

The source of the heat decomposable gas-auxiliary gas mixture is shown at 62 as including a vessel 64 into which the heat decomposable gas and auxiliary gas are introduced from suitable sources 66 and 68, a water jacket 70 for distributing heat throughout the exterior of vessel 64, and heating unit 72 for water jacket 70. In the illustration, the heat decomposable gas is supplied in liquid form as successive drops 74 and is vaporized by a series of jets 76. It will be noted also that the concave surface of zone 34 is cooled as at 78 in order to prevent deposition thereupon and that the gas exhausted at the junction of zones 32 and 34 is cooled as at 80 in order to increase the exhaust effect. In general, the temperatures generated in preheating zone 32 and dwell zone 36 are below the decomposition temperature of the decomposable gas and the temperature generated in decomposition zone 34 is above the decomposition temperature of the decomposable gas.

Preferred ferromagnetic strata of the above described character are produced in the system of FIG. 1 where: the heat decomposable gas is an iron carbonyl, preferably iron pentacarbonyl, which is liquid under usual conditions; alternatively the iron carbonyl may be iron dodecacarbonyl; the auxiliary gas is an inert gas such as nitrogen; the temperature of heating section 38 ranges from 140–180° C.; the temperature of heating section 40 ranges from 180–350° C.; the temperature of heating section 42 ranges from 160–250° C.; the partial pressure of the heat decomposable gas ranges from 75 to 125 mm. Hg; the auxiliary gas is supplied in such a way as to produce a flow through decomposition chamber 34 ranging from 1 to 10 cu. ft./hr.; and substrate 30 is advanced at a rate 1–80 ft./min.

The gaseous metal bearing compounds for use in conjunction with the iron carbonyl where alloys are desired, preferably are selected from: carbonyls such as nickel carbonyl and cobalt carbonyl; alkyls such as aluminum diisobutyl, aluminum triisobutyl; aryls such as vanadium dibenzene; olefins such as biscyclopentadienyls of manganese, cobalt, nickel and vanadium; esters such as cupric acetylacetonate, manganic acetylacetonate, titanylacetylacetonate, nickel acetylacetonate, copper formate and copper acetate; nitro compounds such as copper nitrosyl and cobalt nitrosyl carbonyl; hydrides such as aluminum hydride; and combinations and mixtures thereof such as alkyl and aryl carbonyls including biscyclopentadienyl chlorides, bromides and iodides of titanium and vanadium.

The following non-limiting examples further illustrate the production of ferromagnetic strata in accordance with the present invention.

*Example I*

A paper substrate was advanced through chamber 24 of FIG. 1 at 15 ft./min. Heating section 38 was at 160° C., heating section 40 was at 235° C. and heating section 42 was at 190° C. The spacing between the adjacent curved surfaces of chamber 24 was 1/8 inch. Water jacket 70 was at 85° C. The partial vapor pressure of iron pentacarbonyl was 100 mm. Hg, the total vapor pressure within chamber 64 was 10 oz./sq. inch. The remaining nitrogen was introduced at slightly greater than atmospheric pressure in order to ensure outward flow through the extremities of chamber 24. The flow of gas through decomposition chamber 34 is at the rate of 5 cu. ft. per hr. A coat, 5000 A. thick, composed of 98.5% iron and 1.5% carbon resulted. This coat had the characteristic graininess of the present invention.

*Example II*

The process of Example I was repeated except that the substrate was paper coated with casein. A ferromagnetic stratum of the foregoing dimensions and character was deposited on the casein coating.

*Example III*

The process of Example I was repeated except that the substrate was Mylar. A ferromagnetic stratum of the foregoing dimensions and character was deposited.

*Example IV*

The process of Example I is repeated except that nickel carbonyl and cobalt carbonyl in 2 to 1 ratio, respectively and in a quantity equal to 1/2 the vapor pressure of the iron carbonyl is introduced into the system. The resulting product includes a coating of approximately 59% iron, 24% cobalt, 14% nickel and 3% carbon.

*Example V*

The process of Example IV is repeated except that a partial pressure of copper acetylacetonate and aluminum triisobutyl in 2 to 1 ratio with respect to each other and in amount approximately equal to the vapor pressure of the nickel is introduced. The resulting product is composed of approximately 49% iron, 24% cobalt, 14% nickel, 8% aluminum, 3% copper and 1% carbon.

THE SYSTEM OF FIG. 2

A recording system embodying the present invention is shown in FIG. 3 as comprising a tape 80, corresponding in structure to that of FIG. 1 and a transduction system 86. Tape 80 includes a paper substrate 82 and a ferromagnetic stratum 84 of the type described in detail above. Transduction system 86 includes a transducer comprising an electromagnet 88 having a pair of legs 90 and 92 between which is defined a gap 94. The extremities of legs 90 and 92 are disposed in contiguity to coating 84. The bight of electromagnet 88 is provided with a coil 96 to which is connected an amplifying system 98. Amplifying system 98 communicates with an electroacoustic transduction unit 100 by which the system and its exterior are operatively connected. Such a transduction unit, for example, is a conventional microphone. In practice a direct current voltage modulated by an audio signal is transmitted by transducer 100 through amplifying system 98 to coil 96, in consequence of which an incremental magnetization is impressed upon coating 84 as tape 80 moves. In conventional fashion, the arrangement is reversed as at 102 for reading out. It is preferred that the gap between the legs of transducer 88 be extremely small, preferably within the range of from 50 millionths to one thousandth of an inch. The distance between the legs of transducer 88 and stratum 84 is extremely small say less than .0005 inch. The distance between the legs of transducer 88 and tape 80 is advantageously reduced to zero when a silicone release agent is coated upon stratum 84.

Accordingly, the present invention provides novel processes involving the production of a thin magnetizable coating characterized by low cost, but high quality. In particular, by reason of the process by which the product of the present invention is produced, the thickness of the coating may be easily controlled for excellent uniformity.

Since certain changes may be made in the foregoing description and the accompanying drawing without departing from the scope of the invention herein involved, it is intended that all matter disclosed herewith be interpreted in an illustrative and not in a limiting sense.

What is claimed is:

1. A process of producing a magnetic recording strip, said process comprising the steps of advancing an elongated substrate through a curved path defined by a convex surface and a concave surface, said convex surface and said concave surface being approximately equidistant from each other throughout said curved path, said substrate being in taut contact with said convex surface, the distance between adjacent surfaces of said convex surface and said concave surface ranging between 1/32 and 5/32 of an inch, said path including in sequence a preheat zone, a decomposition zone and a dwell zone, partially sealing said preheat zone at its entrance, said decomposition zone from said preheat zone, and said dwell zone at its exit by gaskets, heating said convex surface of said preheat zone to a temperature ranging from 140 to 180° C., heating said convex surface of said decomposition zone to a temperature ranging from 180 to 350° C., heating said convex surface of said dwell zone to a temperature ranging from 160 to 250° C., introducing a heat decomposable gas to said path approximately at the junction between said dwell zone and said decomposition zone, introducing an inert gas to said path approximately at the entrance to said preheat zone and approximately at the exit from said dwell zone, exhausting said path approximately at the junction between said preheat zone and said decomposition zone, the partial pressure of said heat decomposable gas ranging from 75 to 125 mm. Hg, said auxiliary gas flowing through said path and being exhausted therefrom at a flow rate ranging from 1 to 10 cu. ft./hr., and advancing said substrate at a rate of 1 to 80 ft./min., said heat decomposable gas including at least iron carbonyl, the aforementioned steps being related to produce on said substrate a magnetic stratum comprising essentially a distribution of microscopic grains substantially ranging from 5,000 to 20,000 A. in extent, said magnetic stratum ranging from 30 to 100 millionths of an inch thick, said magnetic stratum comprising from 30 to 70% iron, from 30 to 70% of a metal selected from the class consisting of cobalt and nickel, from 0 to 40% of at least one metal selected from the class consisting of chromium, manganese, gadolinium, vanadium, aluminum, titanium, copper and niobium, and from a trace to 3% of a non-metal selected from the class consisting of oxygen and carbon of which at least between a trace and 1 and 1/4% is carbon.

2. The process of claim 1 wherein said substrate is paper.

3. The process of claim 1 wherein said substrate is an organic polymer.

References Cited by the Examiner

UNITED STATES PATENTS

| | | | |
|---|---|---|---|
| 2,573,748 | 11/51 | Weinstein et al. | 346—74 |
| 2,671,034 | 3/54 | Steinfield | 117—107.1 X |
| 2,789,064 | 4/57 | Schladitz | 117—107.1 |
| 2,914,756 | 11/59 | Heidenian | 346—74 X |
| 2,919,207 | 12/59 | Scholzel | 117—106 |

OTHER REFERENCES

Blois: Preparation of Thin Magnetic Films and Their Properties. In Journal of Applied Physics 26(8) pp. 975–980, August 1955.

WILLIAM D. MARTIN, *Primary Examiner.*

IRVING L. SRAGO, *Examiner.*